United States Patent
Colella et al.

(10) Patent No.: US 10,325,502 B2
(45) Date of Patent: Jun. 18, 2019

(54) PARALLEL PARKING ASSISTANT

(71) Applicant: Ford Global Technologies, LLC, Dearborn, MI (US)

(72) Inventors: Nicholas Colella, Grosse Ile, MI (US); Nunzio DeCia, Northville, MI (US); Stephen Jay Orris, Jr., New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 15/040,757

(22) Filed: Feb. 10, 2016

(65) Prior Publication Data
US 2017/0229020 A1 Aug. 10, 2017

(51) Int. Cl.
| | |
|---|---|
| *G06K 9/00* | (2006.01) |
| *B62D 15/02* | (2006.01) |
| *B60W 30/06* | (2006.01) |
| *G08G 1/16* | (2006.01) |
| *B60K 35/00* | (2006.01) |
| *B60W 10/184* | (2012.01) |
| *B60W 10/20* | (2006.01) |

(52) U.S. Cl.
CPC ............ *G08G 1/168* (2013.01); *B60K 35/00* (2013.01); *B60W 10/184* (2013.01); *B60W 10/20* (2013.01); *B60W 30/06* (2013.01); *B62D 15/028* (2013.01); *B62D 15/0285* (2013.01); *G06K 9/00812* (2013.01); *B60K 2350/106* (2013.01); *B60K 2350/1084* (2013.01); *G06K 9/00805* (2013.01)

(58) Field of Classification Search
None
See application file for complete search history.

(56) References Cited

U.S. PATENT DOCUMENTS

| | | | |
|---|---|---|---|
| 7,176,789 B2 | 2/2007 | Herder | |
| 7,492,282 B2 | 2/2009 | Danz et al. | |
| 8,560,175 B2 | 10/2013 | Bammert et al. | |
| 9,085,321 B2 | 7/2015 | Noh | |
| 2002/0074959 A1* | 6/2002 | Van Wiemeersch | G07C 9/00182 318/445 |

(Continued)

FOREIGN PATENT DOCUMENTS

| | | |
|---|---|---|
| DE | 102014207119 A1 | 10/2015 |
| EP | 3081731 A1 | 4/2015 |

(Continued)

OTHER PUBLICATIONS

Search Report dated Jul. 28, 2017 for Great Britain Patent Application No. GB1702105.6 (5 Pages).

*Primary Examiner* — Navid Ziaeianmehdizadeh
(74) *Attorney, Agent, or Firm* — Frank Lollo; Neal, Gerber & Eisenberg LLP; James P. Muraff

(57) ABSTRACT

The present disclosure relates to parking systems and parking methods. One parking system may include: a vehicle having an accelerator, brakes, wheels, sensors, a display, a processor, and memory; a parking assist program stored in the memory and configured to: receive dimensions of a parallel parking spot and the vehicle, project, based on the received dimensions, whether the vehicle can: exit the parallel parking spot with a future leading block, and exit the parallel parking spot with a future trailing block.

18 Claims, 14 Drawing Sheets

(56) References Cited

U.S. PATENT DOCUMENTS

| | | | |
|---|---|---|---|
| 2004/0201670 A1* | 10/2004 | Mizusawa | B62D 15/0275 348/136 |
| 2009/0271114 A1* | 10/2009 | Herbert | G08G 1/168 701/301 |
| 2010/0045448 A1* | 2/2010 | Kakinami | B60R 1/00 340/435 |
| 2010/0117812 A1* | 5/2010 | Laubinger | B60R 1/00 340/435 |
| 2010/0152972 A1* | 6/2010 | Attard | B62D 15/027 701/42 |
| 2010/0283633 A1* | 11/2010 | Becker | B60R 1/00 340/932.2 |
| 2010/0332080 A1 | 12/2010 | Bae | |
| 2011/0054739 A1* | 3/2011 | Bammert | B62D 15/0285 701/41 |
| 2011/0074604 A1* | 3/2011 | Hsu | G08G 1/168 340/932.2 |
| 2012/0173080 A1 | 7/2012 | Cluff | |
| 2014/0105464 A1 | 4/2014 | Park et al. | |
| 2014/0200769 A1* | 7/2014 | Noh | B62D 15/0285 701/41 |
| 2014/0316632 A1* | 10/2014 | Shaffer | G05D 1/0088 701/23 |
| 2014/0347195 A1* | 11/2014 | Stempnik | G08G 1/14 340/932.2 |
| 2015/0070196 A1* | 3/2015 | Beaurepaire | G08G 1/162 340/932.2 |
| 2015/0088360 A1* | 3/2015 | Bonnet | B60W 30/06 701/23 |
| 2016/0288712 A1* | 10/2016 | Noh | B60R 1/00 |
| 2016/0313731 A1 | 10/2016 | Leppanen et al. | |

FOREIGN PATENT DOCUMENTS

| | | |
|---|---|---|
| FR | 2995274 A3 | 3/2014 |
| GB | 2491720 A | 7/2012 |

\* cited by examiner

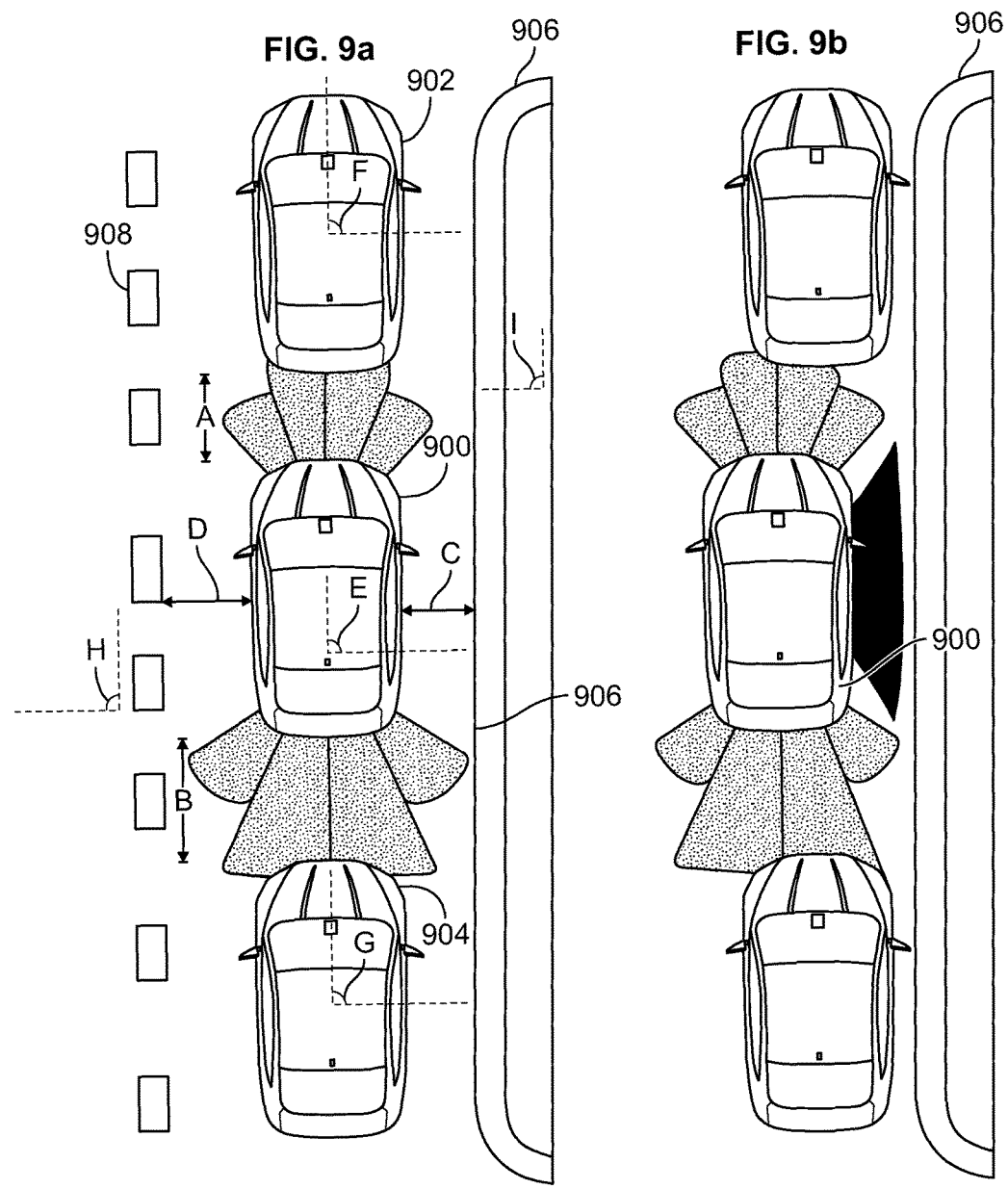

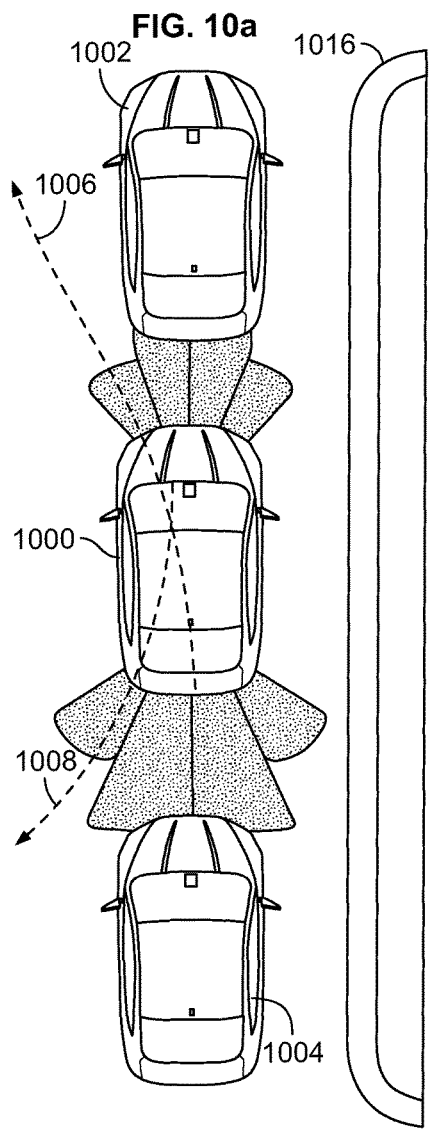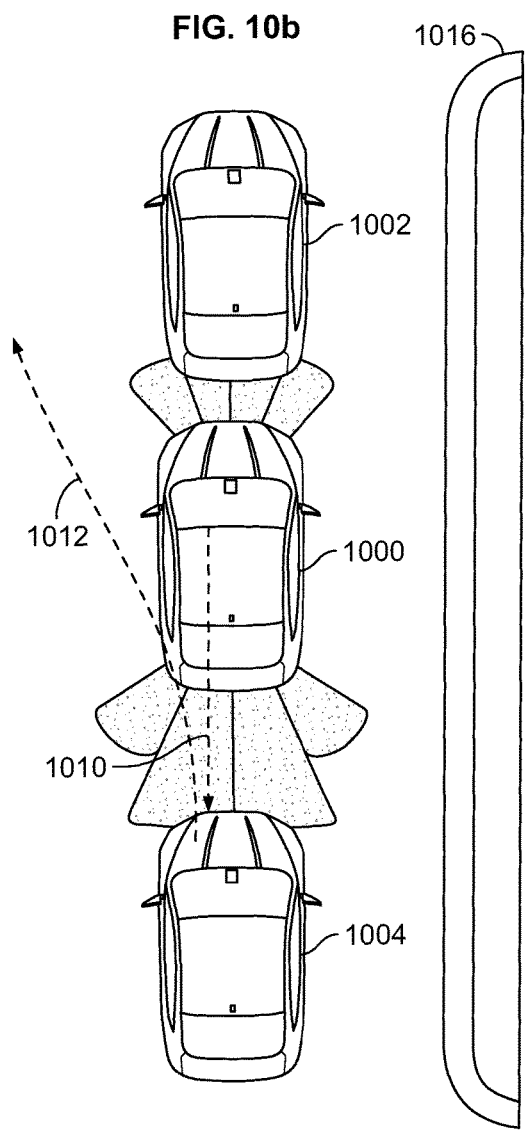

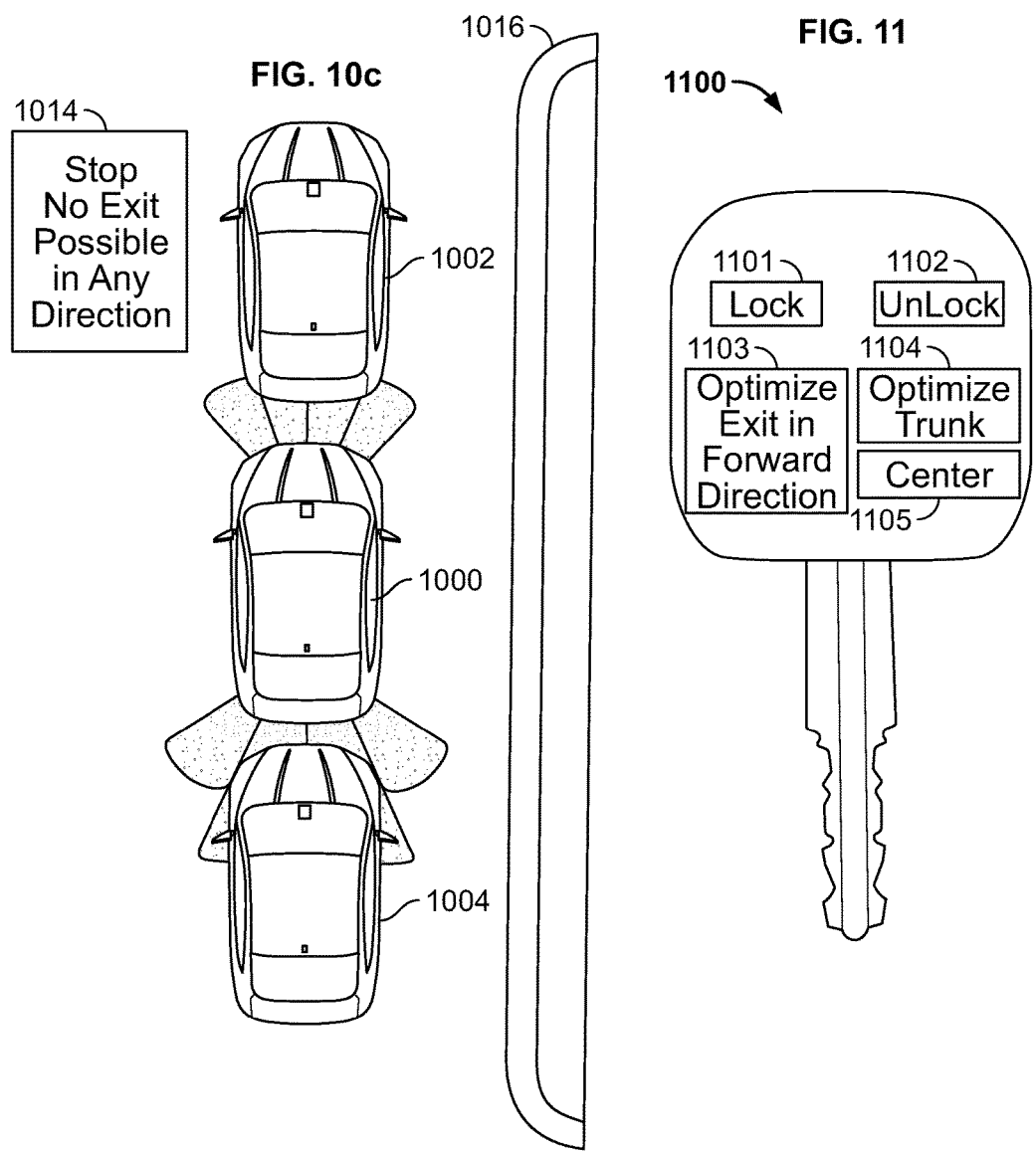

PARALLEL PARKING ASSISTANT

TECHNICAL FIELD

This disclosure generally relates to systems and methods for guided vehicle parking or parallel parking.

BACKGROUND

Some newer vehicles include parallel parking systems that guide a driver into an open parallel parking spot by applying various known mathematical algorithms. A problem is that parallel parking systems may guide a driver into a parallel parking spot that (a) blocks the driver from pulling forward out of the spot, (b) blocks the driver from reversing out of the spot, or (c) blocks the driver from opening one or more doors including the trunk.

SUMMARY

In various embodiments, the present disclosure resolves the above problems with parking systems and parking methods. One parking system may include: a vehicle having an accelerator, brakes, wheels, sensors, a display, a processor, and memory; a parking assist program stored in the memory and configured to: receive dimensions of a parallel parking spot and the vehicle, project, based on the received dimensions, whether the vehicle can: exit the parallel parking spot with a future leading block, and exit the parallel parking spot with a future trailing block.

One parking method may relate to a vehicle having an accelerator, brakes, wheels, sensors, a display, a processor, and memory, and the method may include: with a parking assist program stored in the memory: receiving dimensions of a parallel parking spot and the vehicle, projecting, based on the received dimensions, whether the vehicle can: exit the parallel parking spot with a future leading block, and exit the parallel parking spot with a future trailing block.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 9a to 9d and 10a to 10c illustrate various example parking scenarios.

FIG. 11 is an example key for use with the parallel parking assistant program.

DETAILED DESCRIPTION OF EXAMPLE EMBODIMENTS

Figure 1A:
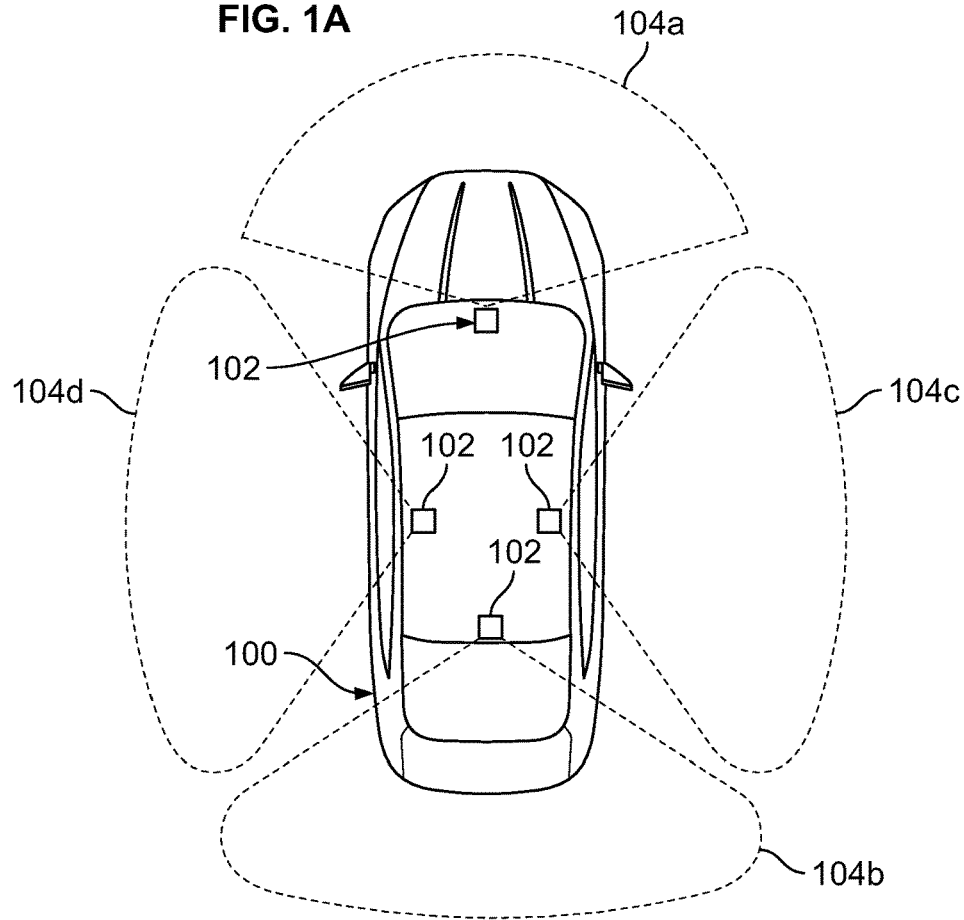
FIG. 1a is a top plan view of an example vehicle.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

Example Hardware

FIG. 1a shows a vehicle 100 in accordance with one embodiment. The vehicle 100 may be a standard gasoline powered vehicle, a hybrid vehicle, an electric vehicle, a fuel cell vehicle, or any other type of suitable vehicle. The vehicle 100 includes standard features (not shown) such as a dashboard, adjustable seats, one or more batteries, an engine or motor, a transmission, an HVAC system including a compressor and electronic expansion valve, a windshield, doors, windows, seatbelts, airbags, and tires. In various embodiments, the vehicle 100 of FIG. 1a is a sedan or an SUV. In various embodiments, the SUV includes a trunk that pivots around the SUV roof as generally shown in FIG. 9e with reference to vehicle 900.

The present disclosure describes some vehicle events with general reference to a gasoline powered vehicle. It should be appreciated that similar disclosure applies to a different vehicle (for example, an electric vehicle), even if the different vehicle lacks an exact corresponding part. For example, some electric cars lack gears. It should be appreciated that disclosure related to gearing features may be implemented in an electric vehicle with respect to motor rotations per minute, vehicle speed, or vehicle direction (i.e., forward or reverse).

Figure 1B:
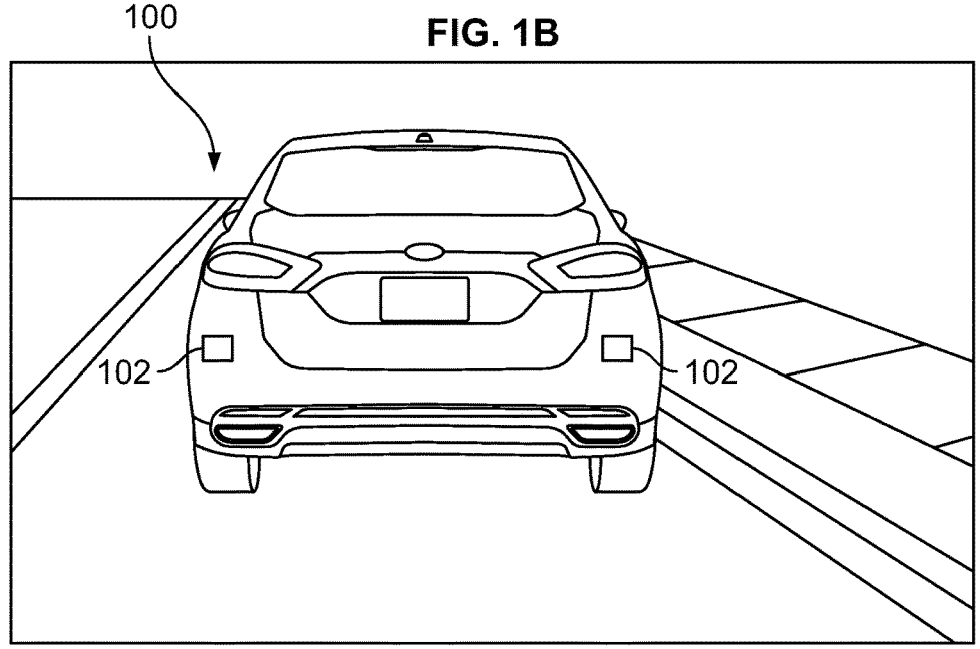
FIG. 1b is a rear perspective view of the example vehicle.

The vehicle 100 may include sensors 102. The sensors 102 can be arranged in, around, and on the car (i.e., locally arranged) in a suitable fashion. The sensors can all be the same or different. There can be many sensors, as shown in FIG. 1b, or only a single sensor. The sensors may include a camera, ultra-sonic sensors, sonar, LiDAR, radar, an optical sensor, or an infrared device configured to measure properties around the exterior of the vehicle, as indicated by the dashed lines 104a to 104d in FIG. 1a. Some sensors 102 may be mounted inside the passenger compartment of the vehicle 100, on the outside or exterior of the vehicle, or in the engine compartment of the vehicle 100. At least one sensor 102 may be used to identify the vehicle's driver via facial recognition, speech recognition, or communication with a device, such as a vehicle key or mobile phone personal to the driver. The sensors may have an OFF state and various ON states. The vehicle 100, or a device operatively connected to the vehicle, may be configured to control the states or activity of the sensors.

In various embodiments, the processor is configured to convert signals (digital or analog) that the sensors generate into dimensional data. Such operations are known in the art. For example, U.S. Publication No. 2014/0105464, which is hereby incorporated by reference in its entirety, discloses a vehicle processor configured to find dimensions of a parking space using information sent by local LiDAR sensors. U.S. Publication No. 2010/0283633, which is hereby incorporated by reference in its entirety, discloses a vehicle processor configured to generate an overhead map of a parking space with local cameras. U.S. Pat. No. 7,176,789, which is hereby incorporated by reference in its entirety, discloses a method for measuring distance with ultrasonic sensors. U.S. Pat. No. 7,492,282, which is hereby incorporated by reference in its entirety, discloses a method and device for finding dimensions of a parking space with ultrasonic sensors.

Figure 2:
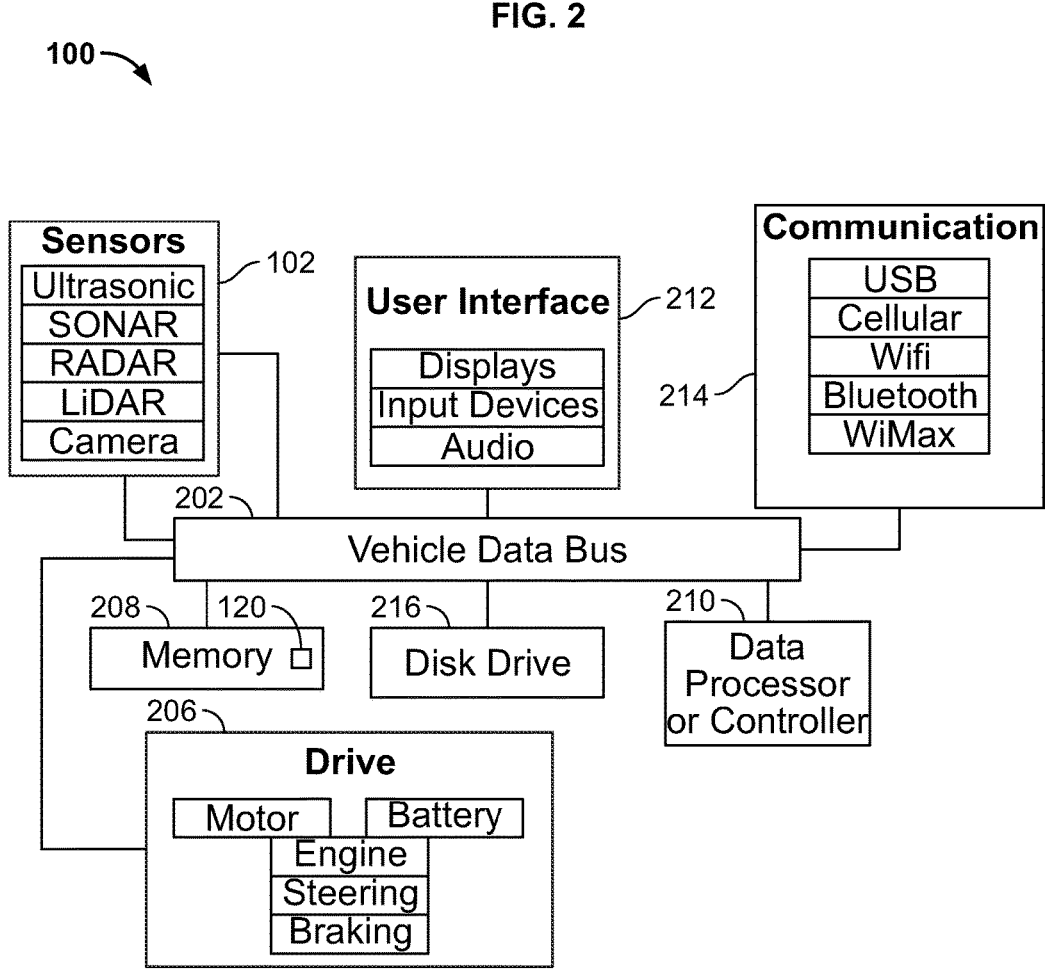
FIG. 2 is an example block diagram of electronics included in the vehicle.

As shown in FIG. 2, in one embodiment, vehicle 100 includes a vehicle data bus 202 operatively coupled to the sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory a non-volatile memory.

The communication devices 214 may include a wired or wireless network interface, including a cellular antenna, to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WiMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface. A suitable network may also include a direct vehicle to vehicle network.

The user interface 212 may include any suitable input and output devices. The input devices enable a driver or a passenger of the vehicle to input modifications or updates to information referenced by the various programs as described herein. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers.

The disk drive 216 is configured to receive a computer readable medium. In certain embodiments, the disk drive 216 receives the computer-readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, parking software or program(s) 120 reside(s) in the memory 208 of the vehicle. The parking program 120 can send and receive data to and from the sensors 102, the user interface 212, the communication devices 214, the drive 206, or any other component operatively connected to the vehicle data bus 202.

In one embodiment, a computing device 105 such as a mobile phone is operatively connected to the vehicle 100 via any suitable data connection such as WiFi, Bluetooth, USB, or a cellular data connection. It should be understand that the term "operatively connected" does not require a direct connection and includes a connection over the Internet.

Figure 3:
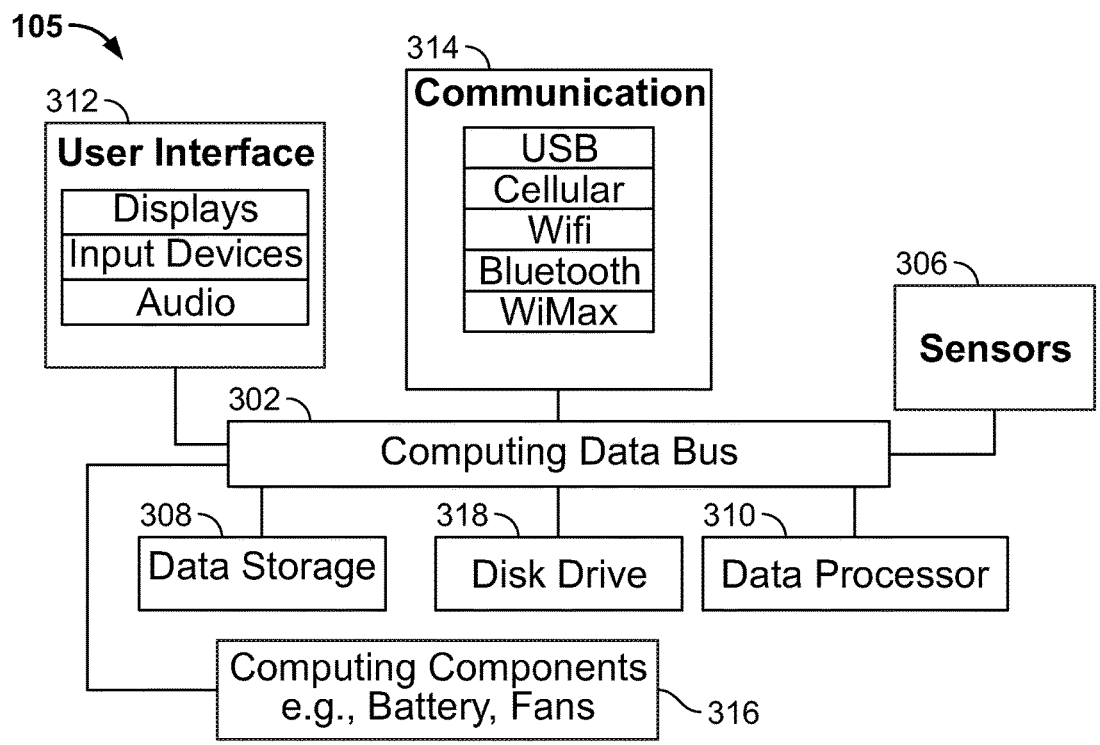
FIG. 3 is an example block diagram of electronics included in a computing device that may be operatively coupled in a wired or wireless manner to the vehicle electronics of FIG. 2.

In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the electronic features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318.

It should be appreciated that any program described herein may be stored and executed on the vehicle 100 or the computing device 105 (such as a mobile phone). In various embodiments, the parking program 120 residing on the vehicle memory includes one or more subprograms, as discussed below. In some embodiments, the subprograms are actually separate and complete programs in configured to intercommunicate as needed.

It should be appreciated that this specification generally refers to the vehicle hosting the parking program 120 as the "instant" vehicle. The instant vehicle has "local" sensors and dimensions. The terms "user" and "driver" are used interchangeably and generally refer to the person in control of the instant vehicle.

Example Programs

Figure 4:
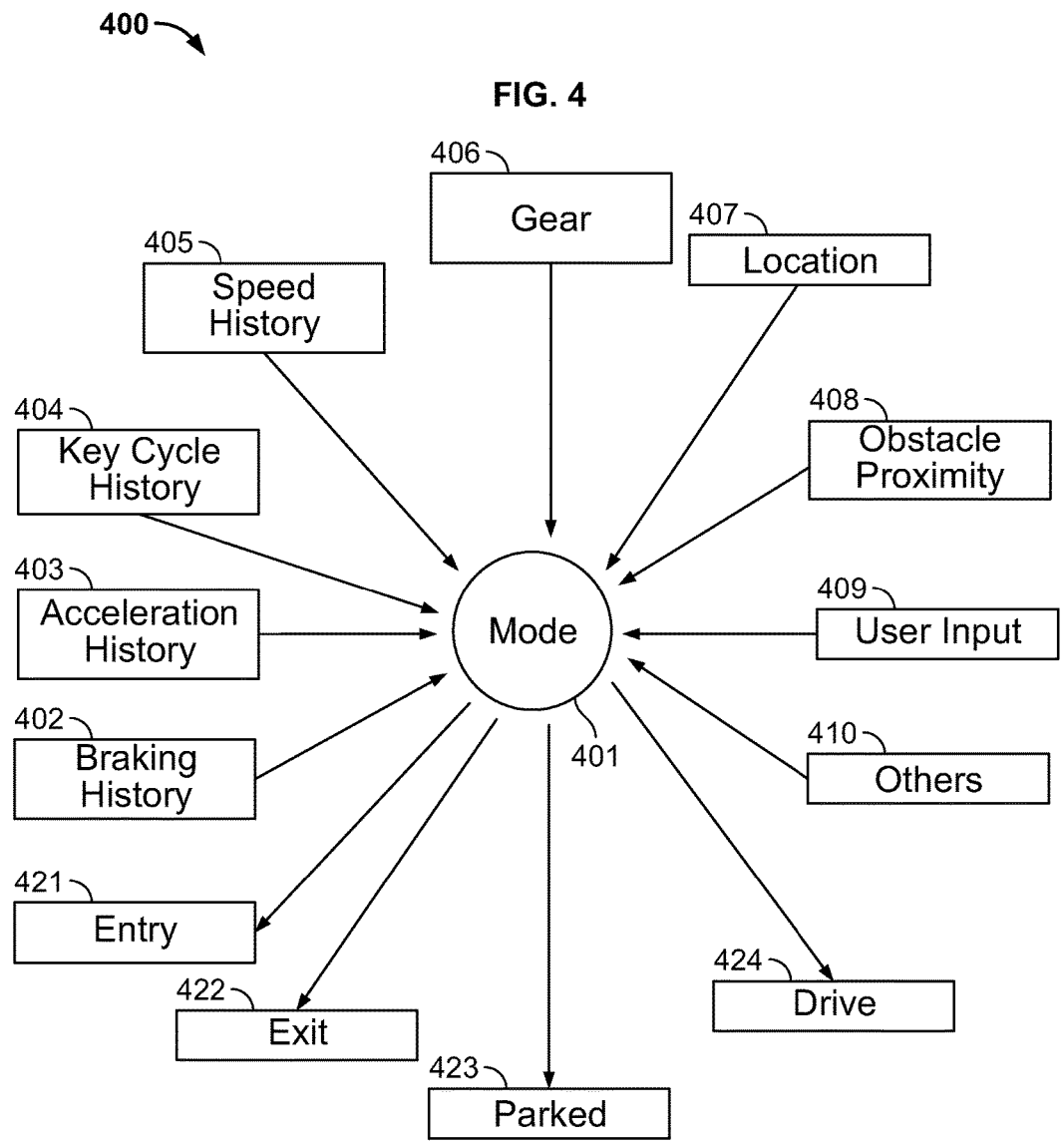
FIG. 4 illustrates various example factors that a parallel parking assistant program may use to determine an operating mode

With reference to FIG. 4, the parking program 120 of the present disclosure may operate in one of four different modes: an entry mode 421, an exit mode 422, a parked mode 423, and a drive mode 424. The drive mode is active when the driver is operating the vehicle and is neither looking for parking, nor engaged in a process of parking. The entry mode is active when a driver is looking for parking or in the process of pulling into a parking spot. The parked mode is active when the vehicle is parked and the driver intends to keep the vehicle parked. The exit mode is active when the driver intends to leave parking spot. It should be appreciated that, depending on sensed or received measurements, the exit mode may be active while the car is parked.

The driver's intent affects the above modes. The parking program 120 of the present disclosure may predict the driver's intent with a mode subprogram 400. The mode subprogram may receive one or more of the following inputs: braking history 402, acceleration history 403, key cycle history 404, speed history 405, current gear selection 406, location 407, obstacle proximity 408, user inputs 409, and other inputs 410. The mode subprogram selects a mode after assessing the one or more inputs with a predetermined algorithm.

According to one example algorithm, the mode subprogram activates entry mode 421 in response to one or more of: the vehicle being within a predetermined location (such as a marked parking zone or within a predetermined distance of a destination), the vehicle being in a specific lane (such as the lane closest to a parking spot), the vehicle having history of at least one acceleration event and one braking event for the current key cycle, the vehicle being in a drive gear and has not exceeded a predetermined speed for a predetermined amount of time. The mode subprogram may keep the entry mode 421 active until the driver parks the vehicle or the driver pulls a sufficient distance away from the parking spot. As another example, the mode subprogram may engage the entry mode when the vehicle is stopped for at least a predetermined amount of time within a predetermined distance of an empty parking spot.

According to one example algorithm, the mode subprogram activates parked mode 423 in response to one or more of: the gear being park, the doors being locked, or the key being outside the vehicle's ignition slot (or sensor area if the key is wireless).

According to one example algorithm, the mode subprogram activates exit mode 422 in response to one or more of: the driver shifting from a parked gear to a drive or reverse gear, the driver unlocking and entering the car, the driver turning on the ignition. The mode subprogram may maintain the exit mode until the vehicle has fully cleared stationary parking obstacles and entered a traffic lane.

According to one example algorithm, the mode subprogram defaults to the drive mode 424. The mode subprogram may also activate drive mode in response to one or more of: the driver entering a certain gear (such as second gear), the driver exceeding a certain speed, or the driver entering a certain lane.

Alternatively or in addition to the above algorithms, the mode subprogram may activate one of the modes in response to a user command, such a press of a button or a voice command. In various embodiments, the mode subprogram alerts the driver prior to activating a new mode.

Figure 5:
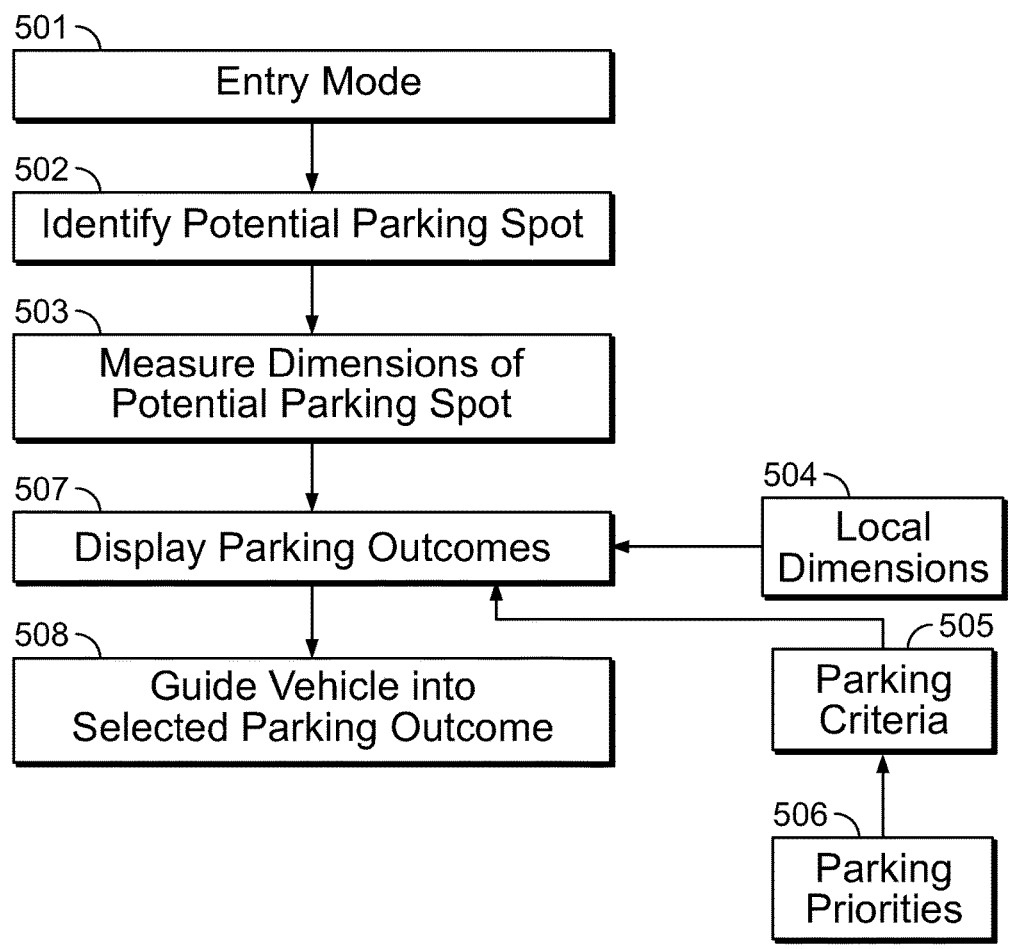
FIG. 5 is one example of an entry subprogram

FIG. 5 generally shows and illustrates an example entry subprogram 500. The entry subprogram may load and execute in response to the mode subprogram 400 activating entry mode in 501. The entry subprogram may use the local vehicle sensors to identify a potential parking spot in 502. The entry subprogram may identify obstacles surrounding the potential parking spot to compute or estimate the dimensions of the parking space. In various embodiments, the dimensions are two-dimensional and in a plane generally parallel to the street. In other embodiments, the dimensions are three-dimensional and include an assessment of vertical space (e.g., assessing whether a tree branch is blocking some portion of the vertical space). As previously discussed, techniques to map and identify obstacles with local vehicle sensors are known in the art.

The entry subprogram measures or receives local vehicle dimensions in 504, which may include: local vehicle turning radii for both pulling forward and reversing, trunk opening geometry, door opening geometry, safety factors, traffic, user preferences, and other inputs. It should be appreciated that local vehicle dimensions may be pre-programmed into the vehicle memory or may be downloaded from an external server. It should further be appreciated that local vehicle dimensions may be dynamically calculated with the local vehicle sensors.

The entry subprogram may find parking outcomes in light of the dimensions of the spot as determined in 503 and the local vehicle dimensions as determined in 504. A parking outcome is the final parking position of the vehicle relative to obstacles surrounding the parking spot. With reference to FIG. 9a, the following dimensions may describe a parking outcome: local dimensions of the vehicle 900, dimensions of the leading and trailing obstacles 902 and 904 (shown as vehicles, but could be other obstacles such as debris), relative distance A between leading end of the vehicle 900 and the leading obstacle 902, relative distance B between the trailing end of the vehicle 900 and the trailing obstacle 904, relative distance C between the vehicle 900 and the curb 906, relative distance D between the vehicle 900 and a traffic lane marker 908, alignments E, F, and G of the vehicle 900 and the obstacles 902 and 904, alignment H of the traffic lane 908, alignment I of the curb. The entry subprogram may make similar measurements in the vertical direction. Configuring the vehicle sensors and the vehicle processor to capture exterior dimensions is known in the art. See, for example, U.S. Pat. No. 8,560,175, which is hereby incorporated by reference in its entirety.

Figure 12:
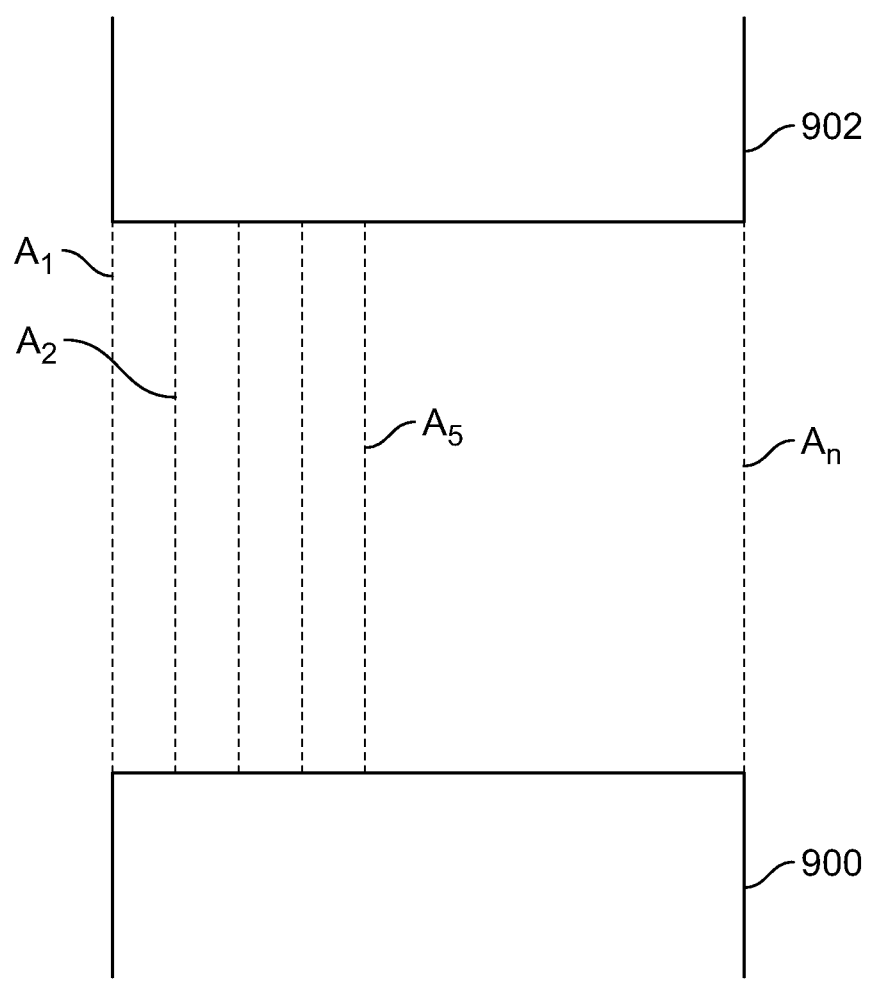
FIG. 12 illustrates an example measurement process.

It should be appreciated that although the dimensions are shown as single measurements in FIG. 9a, the dimensions may comprise a plurality of measurements. For example, the entry subprogram may split dimension A into thousands of measurements from the leading edge of the vehicle to the trailing edge of the leading vehicle. FIG. 12 illustrates this technique where the general dimension of A comprises a plurality of measurements $A_1$ to $A_n$. The plurality of measurements may be combined according to a predetermined algorithm to yield a single representative dimension, such as dimension A. In various embodiments, the representative dimension is the smallest of the plurality of measurements.

The entry subprogram may apply techniques to simplify or accelerate computation. In one example, the entry subprogram predicts the likely best outcomes in light of a cursory overview of the data set, and then performs a thorough or detailed analysis on only the predicted best outcomes. In another example, the entry subprogram finds outcomes in certain definite increments (e.g., in increments of two centimeters from the leading edge of the trailing obstacle).

Eventually, the entry subprogram culls or filters the thoroughly analyzed outcomes to a predetermined number of most suitable outcomes in light of various criteria. The entry subprogram may cull with an optimization technique such as an Euler-Lagrange optimization technique.

Figure 8:
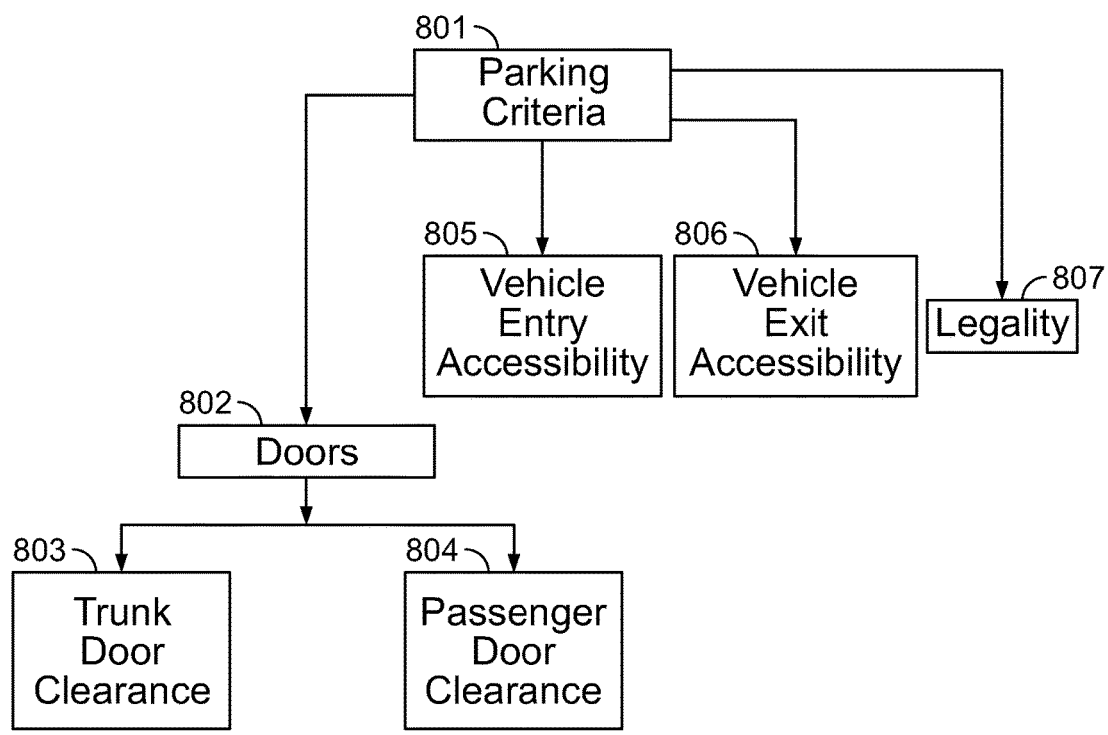
FIG. 8 illustrates various example topics that the parallel parking assistant program may present to a user.

In various embodiments, the entry subprogram filters the outcomes by optimizing one or more criteria 505 in light of parking priorities 506. FIG. 8 shows a map 800 of various example criteria 801, including:

(1) Projected clearance vehicle doors 802 including the vehicle trunk 803 and one or more of the vehicle passenger doors 804. The projected clearance may serve as a proxy for estimating the ability of the door to fully open and a human to stand or occupy space near the door. In various embodiments, the entry subprogram only rates vehicle doors corresponding to current passengers. In various embodiments, the entry subprogram breaks projected clearance into a door clearance component (i.e., how much room a door has to open) and a human clearance component (i.e., how much space or two-dimensional area a human could occupy adjacent the opened door).

(2) Vehicle entry accessibility 805, which is a rating of how complicated a parking maneuver is required to park the vehicle in the position under evaluation. In various embodiments, vehicle entry accessibility depends on a number of gear changes (i.e., forward to reverse or reverse to forward) needed to enter the parking spot. It should be appreciated that methods for predicting parking maneuvers in light of measured dimensions are known in the art. See, for example, U.S. Pat. No. 8,560,175, which is hereby incorporated by reference in its entirety.

(3) Vehicle exit accessibility 806, which is a rating of how complicated a driving maneuver is required to exit the parking spot. In various embodiments, vehicle exit accessibility depends on a number of gear changes needed to exit the parking spot.

In various embodiments, the entry subprogram evaluates exit accessibility assuming that one of dimensions A or B shrinks to a predetermined value, such as zero, while the car is parked. More specifically and with reference to FIG. 9*a*, the entry subprogram may assume that a new vehicle parks directly behind the instant vehicle 900 while the leading vehicle 902 stays put, thus inhibiting the instant vehicle 900 from backing up with respect to its initial position. The entry subprogram then calculates exit accessibility, given that only dimension A would be available in the longitudinal direction. Next, the entry subprogram may assume that vehicle 904 stays put while a new vehicle parks directly in front of the instant vehicle 900, shrinking dimension A substantially to zero. The entry subprogram then calculates exit accessibility, given that only dimension B would be available in the longitudinal direction.

(4) Legality of the park 807. Various jurisdictions have laws regarding how close (or far away) a vehicle must park with respect to a curb, a fire hydrant, a stop sign, etc. The vehicle 100 may download such information from a remote database, and then evaluate a parking outcome in light of the applicable laws.

Returning now to FIG. 5, the entry subprogram may collect priorities 506, which include user-adjustable rankings of the importance of the above parking criteria. The entry subprogram then displays a predetermined number of parking outcomes in light of the priorities in 507. In one example, a user prioritizes vehicle exit accessibility in both the forward and reverse directions. In this example, the entry subprogram displays parking outcomes that enable the driver to exit assuming that one of dimensions A and B shrinks to zero, as described above. In another example, a driver prioritizes (a) at least a certain amount of trunk accessibility space (e.g., dimension B in FIG. 9*a*), and (b) an ability to exit the space in any direction. If multiple parking outcomes are suitable (i.e., satisfy the listed priorities), then the entry subprogram displays outcomes that optimize other criteria as well, such as vehicle entry or trunk clearance.

The entry subprogram may enable a driver to scroll through various parking outcomes and select new criteria or priorities while the vehicle idles. In various embodiments, the parking outcomes are contained in a list or a series of lists, sorted according to an optimized criteria or a most highest criteria rank. In various embodiments, the entry subprogram automatically selects a parking outcome for the user.

After the entry subprogram selects a parking outcome, the entry subprogram guides the vehicle accordingly in 508. The guiding may be via autonomous vehicle control, via semi-autonomous vehicle control, or via visual instructions for the user. Suitable guiding software is known in the art.

Figure 6:
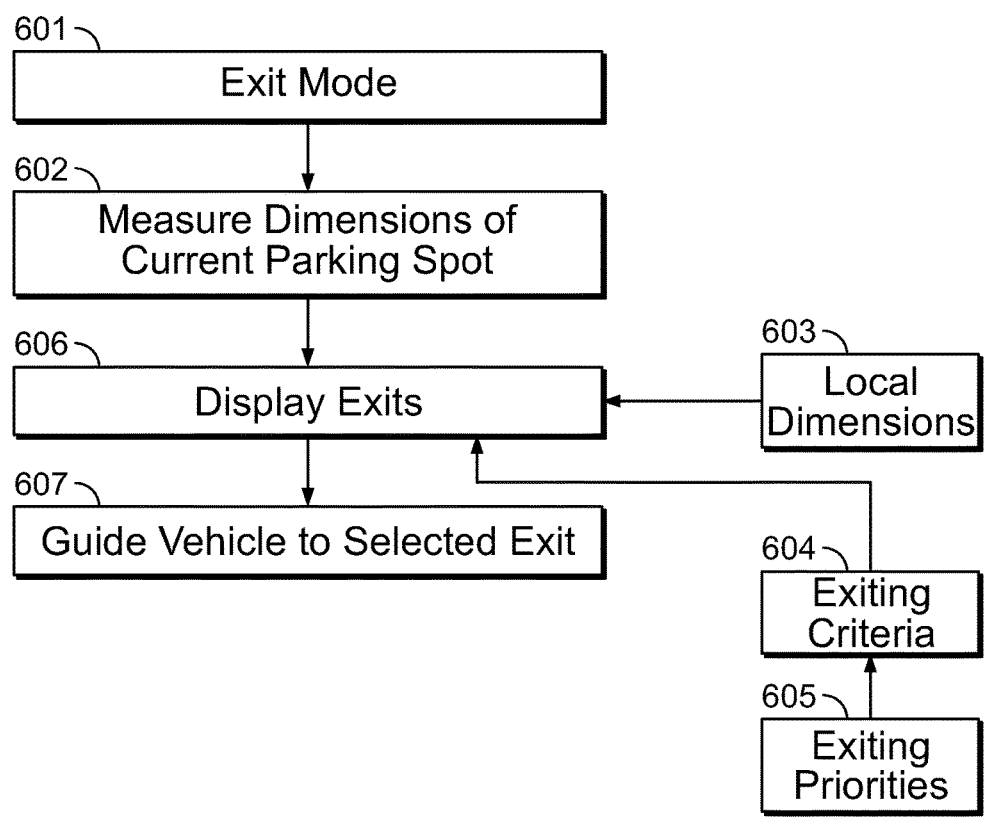
FIG. 6 is one example of an exit subprogram.

FIG. 6 generally shows and illustrates an example exit subprogram 600. The exit subprogram 600 may load and execute in response to the mode subprogram 400 activating exit mode in 601.

The exit subprogram may collect dimensions of the parking space 602. In 603 the exit subprogram may collect local vehicle dimensions. In 606, the exit subprogram may display exits in light of exit criteria 604 and exit priorities 605. Criteria may include (a) accessibility of pulling out of parking spot in the forward direction, (b) accessibility of reversing out of parking spot in the backward direction, (c) legality of exiting maneuver, and others.

The exit subprogram may rank the exits in light of user priorities. In one example, a user prefers pulling forward out of a parking spot and thus the exit subprogram assigns forward exits a higher rank. In another embodiment, a user prefers minimizing the total number of gear shifts and thus the exit program ranks the exits accordingly. As discussed above, in various embodiments, accessibility depends on a number of gear shifts (i.e., directional changes) needed to perform the exit.

Eventually, the exit subprogram selects an exit via user command or automatically. In 607, the exit subprogram may guide the vehicle accordingly. The guiding may be via autonomous vehicle control, via semi-autonomous vehicle control, or via visual instructions for the user. Suitable guiding software is known in the art.

Figure 7:
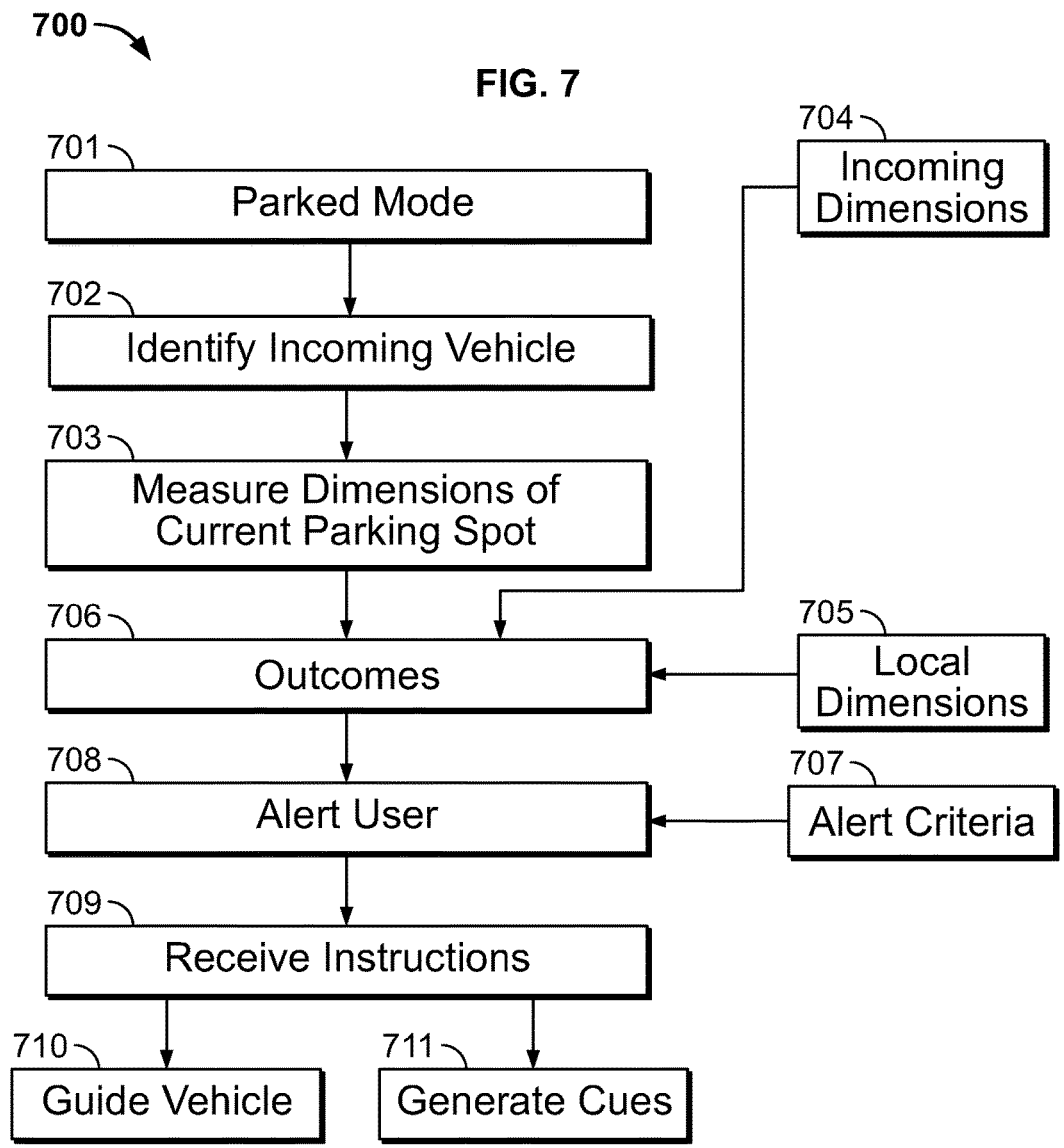
FIG. 7 is one example of a parked subprogram.

FIG. 7 generally shows and illustrates an example parked subprogram 700. The parked subprogram 700 may load and execute in 701 in response to the mode subprogram 400 activating parked mode. The mode subprogram is generally configured to (a) alert a user when a new obstacle, such as a vehicle, blocks the instant vehicle, and (b) dissuade the operator of the new obstacle from blocking the instant vehicle.

In 702, the parked subprogram may identify a new potential obstacle such as an incoming vehicle. In 703, the parked subprogram may measure dimensions of the current parking spot. In 704 and 705, the parked subprogram may collect the local vehicle dimensions and the dimensions of the incoming vehicle. The parked subprogram may actively measure these dimensions or may download them from a database in light of vehicle model information.

The parked subprogram may predict parking outcomes 706 and specifically predicts how dimensions describing the current parking outcome will change in light of the incoming obstacle or vehicle (these dimensions are described below with reference to FIG. 9*a*). In various embodiments, the parked subprogram dynamically updates parking outcomes in light of new events and specifically new position data of the incoming obstacle or vehicle. In various embodiments, the parked subprogram assumes that the incoming vehicle will park in the most favorable possible position with respect to the instant vehicle. In various embodiments, the parked subprogram assumes that the incoming vehicle will park at some user-specified superposition of most favorable and least favorable positions (without actually colliding with the instant vehicle). In various embodiments, the parked vehicle delays proceeding to the next step until the incoming vehicle stops.

The parked subprogram may send a remote or wireless communication 708 to a device, such as a mobile phone associated with the user, when likely outcomes satisfy predetermined alert criteria 707. In one example, a user configures the parked subprogram to send a message to the user when one or more of the following occur: (a) the incoming vehicle is predicted to block the instant vehicle from exiting its parked position in the leading direction, (b) the incoming vehicle is predicted to block the instant vehicle from exiting its parked position in the leading direction, (c) the incoming vehicle has caused (a) or (b), (d) the incoming vehicle has collided with the instant vehicle.

The parked subprogram may be configured to accept a user instruction 709 in response to the remote communication. The command may cause the vehicle to autonomously move 710. Alternatively or in addition, the command may cause the vehicle to activate one or more cues 711 directed to the incoming vehicle. The cues may be lights, sounds, or an electronic communication (if the incoming vehicle is so-equipped).

Alternatively or in addition, the parked subprogram may automatically perform any of the above without user instruction or according to pre-set user preferences. In various embodiments, the parked subprogram causes the tail lights of the instant vehicle to flash at a frequency variably related to a dimension between the instant vehicle and the closest edge of the incoming vehicle.

Example Applications

FIGS. 9 and 10 generally show and illustrate various examples applications of the present disclosure. It should be appreciated that these Figures have dual purpose: (1) they represent and describe an actual state of the vehicle in relation to other vehicles, the curb, and other obstacles; (2) they represent potential graphics for display on a user interface to help guide the driver into, or out of, a suitable parking position.

FIGS. 9a to 9d generally apply to parking entry and FIGS. 10a to 10c generally apply to parking exit. It should be appreciated, however, that the entry subprogram may be configured to display content associated with FIGS. 10a to 10c in order to show potential exits for a parking spot. It should be appreciated that the parked subprogram may be configured to display (or cause to be displayed on the user's mobile device) content associated with FIGS. 10a to 10c.

In various embodiments, the parking program 120 displays these Figures alternatively or in addition to the displays and operations disclosed above. In one embodiment, the entry subprogram, upon activation, foregoes a pre-assessment of the parking spot with the criteria and priorities and dynamically displays applicable and generates graphics of FIGS. 9 and 10 in light of steps 502, 503, and 504 while the driver is executing a parking entry. Similar disclosure applies to the exit subprogram. This may simplify the subprogram and enable the driver to make his or her own decisions about the suitability of the parking spot. In other embodiments, these graphics supplement the complete subprograms and are displayed, for example, in steps 507, 606, and 708. In various embodiments, the entry subprogram is configured to enable a driver to choose between the above options and alternatives. It should be appreciated that these graphics may be dynamic and change as the local sensors record new data.

In various embodiments, the parking program classifies parking exits and displays the exits according to class: one class of exit is where a vehicle maintains either drive or reverse throughout the exit and will be referred to as a "smooth exit"; another class of exit is where the vehicle must pull forward, reverse, pull forward, reverse, etc. all while adjusting its alignment until the vehicle has sufficient room and alignment to exit the parking spot. The same concept applies if the driver must reverse first, then pull forward, etc. These will be referred to as "pointed exits." It should be appreciated that the parking program 120 of the present disclosure may enable a user to select only smooth exits or both of smooth and pointed exits as acceptable parking exits options. In various embodiments, this preference is included as vehicle exit accessibility as described above and shown in FIG. 8. It should be appreciated that similar disclosure can apply to parking entry (i.e., parking entries can be classified or displayed as smooth or pointed in the forward and reverse directions).

In various embodiments, the parking program 120 calculates and indicates, with different text or graphics, the following exits: (a) a smooth exit in a specific direction; (b) a pointed exit in a specific direction. In various embodiments, the parking program 120 displays or indicates a number of gear changes required during a pointed exit. In various embodiments, the parking program displays corresponding information for parking entries. In various embodiments, a maximum number of gear changes is coded into the program (e.g., ten or more gear changes is unacceptable and a parking spot requiring ten or more gear changes would be indicated as unsuitable or blocked). In various embodiments, a lower maximum applies to the entry program than the exit program (or no maximum applies to the exit program), so the program is configured to direct a driver out of an existing tight parking spot if a complicated pointed exit is necessary.

With reference to FIGS. 9 and 10, it should be appreciated that gray bubbles or projections may signify that a smooth parking exit is possible in the respective direction; white projections may signify that a pointed parking exit is possible in the respective direction; dashed lines may indicate a path for exiting; white (or red—not shown) projections coupled with a supplemental stop text or graphic signify that no exit is possible; black projections may signify that the dimension is too large (e.g., illegal). As described above, it should be appreciated that the graphics may be changed, upon user selection, to reflect parking entries, instead of parking exits. More specifically, gray projections may signify that a smooth parking entry is possible in the respective direction; white projections may signify that a pointed entry is possible in the respective direction; dashed lines may indicate a path for entry; white (or red—not shown) coupled with supplemental graphics may signify that no entry is possible.

FIGS. 9a to 9d generally illustrate potential graphics for display during the parking process by the entry subprogram and more specifically, illustrate the instant vehicle 900, a leading vehicle 902, and a trailing vehicle 904.

Figure 9C:
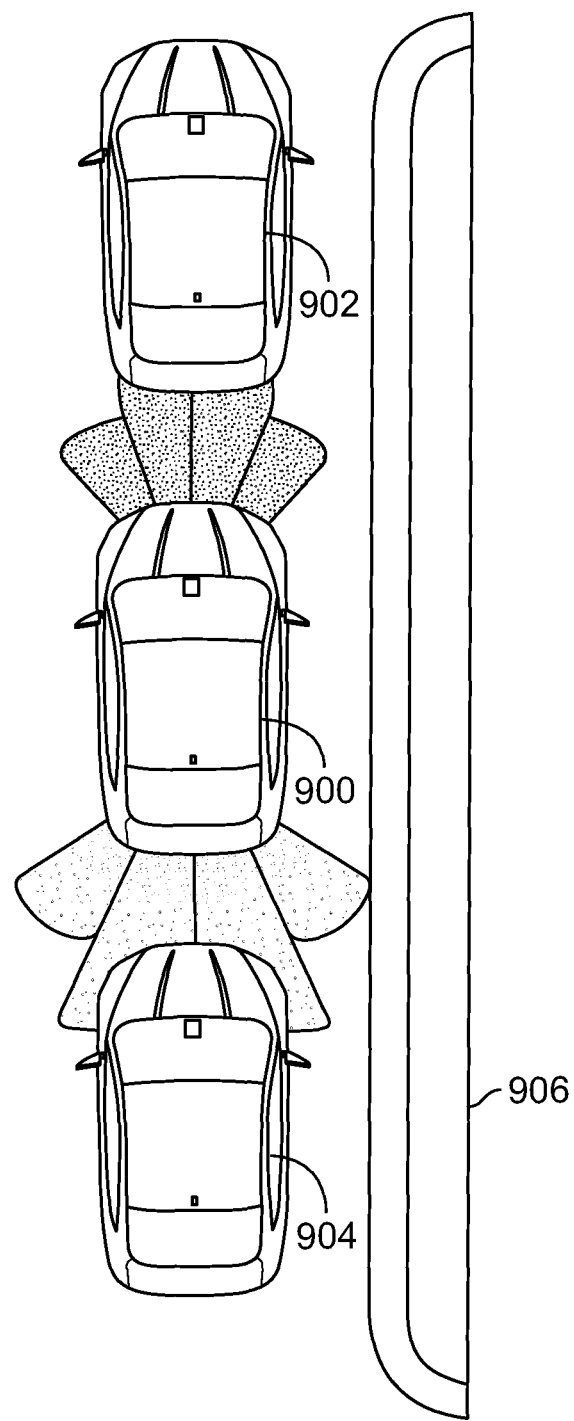
Figure 9D:
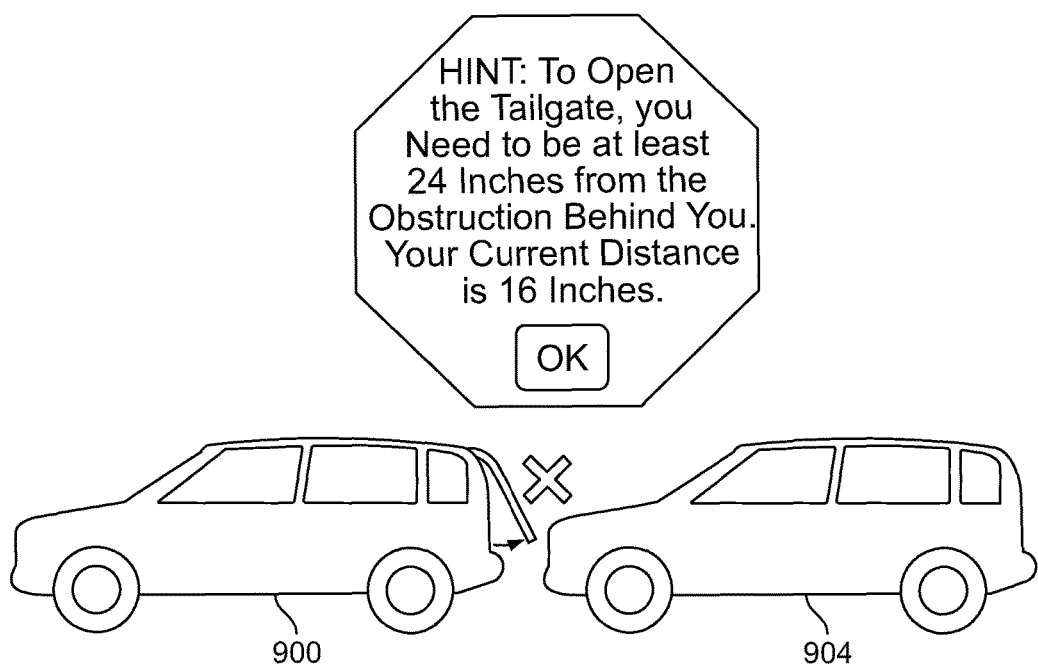

In FIG. 9a, the instant vehicle 900 is capable of a smooth exit in both the forward and reverse directions. In FIG. 9b, the instant vehicle is capable of a smooth exit in both the forward and reverse directions, but is currently in an illegal position with respect to the curb. In FIG. 9c, the instant vehicle 900 is capable of a smooth exit in the forward direction, but would require a pointed exit in the reverse direction should dimension A shrink to zero. In FIG. 9d, the instant vehicle is in a position where the trailing vehicle has blocked the trunk from fully opening. In various embodiments, this event is included as part of the graphics of FIGS. 9a to 9c, as a separate color for example.

FIGS. 10a to 10c generally illustrate graphics displayed during the exiting process by the exit subprogram and more specifically, illustrate the instant vehicle 1000, a leading vehicle 1002, a trailing vehicle 1004, calculated exit paths 1006, 1008, 1010, and 1012, a stop indicator 1014, and a curb 1016.

In FIG. 10a, the instant vehicle 1000 is capable of a smooth exit via calculated path 1006 or calculated path 1008. In FIG. 10b, the instant vehicle 1000 is capable of a pointed exit by reversing according to calculated path 1010, then pulling forward according to calculated path 1012. In FIG. 10c, the instant vehicle 1000 is blocked by leading vehicle 1002 and trailing vehicle 1004. No smooth or pointed exit is possible as indicated by graphic 1014.

It should be appreciated that in addition to the color schemes of FIGS. 9 and 10, the parking program 120 may quantify a relevant dimension with a number. It should be appreciated that a user may pull up a screen corresponding to FIG. 9a that shows numbers corresponding to all measured dimensions. Although no paths entry paths are shown, it should be appreciated that the entry subprogram may be configured to calculate an entry path similar (albeit reversed) to paths 1006, 1008, 1010, and 1012.

Turning now to FIG. 11, an example key 1100 associated with the present invention is generally shown and illustrated. It should be appreciated that the functionality of the example key 1100 may be included in any suitable device, such as an application loaded on a mobile phone 105. The key 1100 includes buttons 1101 to 1105. Buttons 1101 and 1102 lock and unlock the associated vehicle.

Buttons 1103 to 1105 transmit signals to the associate vehicle, causing the vehicle to autonomously move. More specifically, button 1103 instructs the vehicle to optimize a forward exit. This would entail autonomously maneuvering the vehicle until it is ready for a smooth exit in the forward direction (a similar button could be included for a smooth exit in the reverse direction). As a result, the vehicle will perform a pointed exit maneuver until it reaches the final step of pulling out of the parking space. Button 1104 instructs the vehicle to optimize trunk opening space. As a result, the vehicle will pull forward until dimension A substantially shrinks to zero or dimension B has reached a predetermined value, enhancing user trunk access. Button 1105 instructs the vehicle to center between the leading vehicle 1002 and the trailing vehicle 1004, such that dimensions A and B are substantially identical. Centering could minimize chances of a collision when the leading or trailing vehicle exits. In various embodiments, a software program on a mobile device corresponding to key 1100 enables a driver to specify one or more of the dimensions shown in FIG. 9a, which causes the vehicle to autonomously readjust accordingly.

The parking program 120 of the present vehicle may be configured to receive, interpret, and process the above instructions from the key 1100. In various embodiments, instructions from the key 1100 cause the parking program 120 to interface with and direct an autonomous driving program. In various embodiments, the parking program 120 executes an instruction to maximize a dimension up to a certain predetermined number. For example, if a leading vehicle is absent and the user presses the center command, the instant vehicle may maximize dimension B up to a predetermined value then stop. It should further be appreciated that all instructions can be filtered through the parking program 120 to eliminate collisions and that the parking program 120 may decline to implement any instruction that causes a collision.

It should be appreciated that for the purposes of the claims, a "loaded vehicle" is hereby defined to be a vehicle comprising a steering system, an acceleration system with an engine or motor, a braking system including brakes configured to decelerate the vehicle, wheels, wherein at least one of the wheels is configured to receive torque generated by the engine or motor, one or more seats, at least one processor, and memory operatively coupled to the processor. It should be appreciated that the above definition applies, and only applies, when the claims specifically include the term "loaded vehicle."

It should be appreciated that for the purposes of the claims, the term "simultaneously," as it relates to a computer program, conveys that the programs are queued for immediate processing (or being processed) at the same time. The term "simultaneously" does not require that the processor actually simultaneously execute the two programs. In other words, the term "simultaneously" covers a situation where a single core of a processor is tasked with executing two threads of software.

It should be appreciated that for the purposes of the claims, the term "leading block" means that that a vehicle is substantially blocked in the leading or forward direction. In other words, the vehicle must exit with a smooth reverse (i.e., driving backward while executing one or more steers) or a pointed reverse (e.g., backwards, forward, backwards, etc. while executing a series of steers). The term "trailing block" means that the vehicle is substantially blocked in the trailing or backward direction. In other words, the vehicle must exit with a smooth advance (i.e. driving forward while executing one or more steers) or a pointed advance (i.e., driving forwards, backwards, forwards, etc. while executing a series of steers or steering maneuvers).

It should be appreciated that for the purposes of the claims, the term "smooth" entry/exit means an entry/exit that does not requiring a change from forward to reverse or from reverse to forward; a "pointed" entry/exit means an entry/exit that requires at least one change from forward to reverse or reverse to forward.

It should be appreciated that for the purposes of the claims, the term "a program" encompasses one or more programs.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A vehicle comprising:
sensors configured to measure surrounding areas of the vehicle;

and processors configured to:
while the vehicle is parked:
determine exit strategies based on the measured surrounding areas;
rank the exit strategies based on a number of gear shifts required for the vehicle to exit;
transmit the ranked exit strategies to a remote device; and
autonomously move the vehicle in response to the transmission and receiving a command from the remote device.

2. The vehicle of claim 1, further comprising a vehicle trunk, wherein the processors are further configured to:
upon parking, determine whether the vehicle trunk can fully open based on the measured surrounding areas.

3. The vehicle of claim 1, further comprising a vehicle trunk, wherein the processors are further configured to:
project a series of potential parallel parking outcomes based on the measured surrounding areas, and
determine, for each of the potential parallel parking outcomes whether the vehicle trunk can fully open.

4. The vehicle of claim 1, wherein the processors are further configured to:
determine, based on the measured surrounding areas, whether each of the exits strategies is smooth or pointed.

5. The vehicle of claim 1, further comprising a vehicle trunk, wherein the processors are further configured to:
cause graphics based on the measured surrounding areas to appear on a display, the graphics indicating:
the exit strategies; and
whether the vehicle can fully open the vehicle trunk.

6. The vehicle of claim 5, wherein the graphics indicate whether each of the exit strategies is smooth or pointed.

7. The vehicle of claim 1, wherein the processors are further configured to:
determine, based on the measured surrounding areas, whether the vehicle is a legal distance from a detected curb.

8. The vehicle of claim 1, wherein the processors are further configured to:
automatically engage a parking entry mode and automatically engage a parking exit mode based on the measured surrounding areas.

9. The vehicle of claim 1, wherein the processors are further configured to cause the vehicle to maximize trunk access space up to a predetermined value in response to receiving a signal from the remote device.

10. The vehicle of claim 1, wherein the processors are further configured to:
cause the vehicle to transmit a wireless message when an incoming vehicle causes one of a leading block and a trailing block, the message including whether a new parking exit is available and if so, whether the new parking exit is smooth or pointed.

11. A method of operating a vehicle, the method comprising:
measuring, via sensors of the vehicle, surrounding areas of the vehicle, and
while the vehicle is parked:
determining, via vehicle processors, exit strategies based on the measured surrounding areas;
ranking, via vehicle processors, the exit strategies based on a number of gear shifts required for the vehicle to exit;
transmitting, via vehicle processors, the ranked exit strategies to a remote device; and
responsive to the transmission and receiving a command from the remote device, autonomously moving, via the vehicle processors, the vehicle.

12. The method of claim 11, further comprising:
projecting, via the vehicle processors, a series of potential parallel parking outcomes based on the measured surrounding areas, and
for each of the potential parallel parking outcomes, determining, via the vehicle processors, whether a vehicle trunk can fully open.

13. The method of claim 11, further comprising:
displaying, via the vehicle processors, graphics based on the measured surrounding areas on a display, the graphics indicating:
the exit strategies, and
whether the vehicle can fully open a vehicle trunk.

14. The method of claim 13, wherein the graphics indicate whether the exit strategies is smooth or pointed.

15. The method of claim 11, further comprising:
based on the measured surrounding areas, determining, via the vehicle processors, whether the vehicle is a legal distance from a detected curb.

16. The method of claim 11, further comprising:
automatically engaging, via the vehicle processors, a parking entry mode and automatically engaging a parking exit mode based on the measured surrounding areas.

17. The method of claim 11, further comprising:
transmitting, via the vehicle processors, a signal from a remote device instructing the vehicle to maximize trunk access space up to a predetermined value.

18. The method of claim 11, further comprising:
causing, via the vehicle processors, the vehicle to transmit a wireless message when an incoming vehicle causes one of a leading block and a trailing block.

* * * * *